United States Patent [19]

Forgey et al.

[11] Patent Number: 4,991,964
[45] Date of Patent: Feb. 12, 1991

[54] LASER STRESS MEASUREMENT APPARATUS AND METHOD

[75] Inventors: Moody K. Forgey; Santos Garza, both of Lubbock, Tex.

[73] Assignee: Texas Instruments Incorporated, Dallas, Tex.

[21] Appl. No.: 237,603

[22] Filed: Aug. 26, 1988

[51] Int. Cl.⁵ ............................................. G01B 11/30
[52] U.S. Cl. ..................................... 356/371; 356/32
[58] Field of Search ................................. 356/371, 32

[56] References Cited

U.S. PATENT DOCUMENTS 4,332,477  6/1982  Sato ..................................... 356/371

OTHER PUBLICATIONS

Chetverikov et al., "Measurement of Internal Stresses in Films", Translated from *Zavodskaya Laboratoriya*, vol. 46, No. 1 pp. 76–77, Jan., 1980 copy in class 356, subclass 32.

*Primary Examiner*—Davis L. Willis
*Assistant Examiner*—Matthew W. Koren
*Attorney, Agent, or Firm*—Ronald O. Neerings; Thomas W. Demond; Melvin Sharp

[57] ABSTRACT

In semiconductor processing, it is desirable to protectively cover the wafer (40) prior to sawing the wafer (40) into individual chips. The compressive nitride protective cover tends to bow the normally flat surface of the wafer (40). If the compressive stress is too great, the wafer (40) and the circuits thereon may be damaged. The laser stress measurement apparatus (10) provides a method for checking the wafer (40) for excess stress without destroying the wafer (40). A light source (12) emits a beam of light onto a reflector (22) which reflects the light onto wafer (40). The light is deflected by wafer (40) back to the reflector (22) and thence to a light detector (52). The light detector (52) is positioned to receive the light in an exact center such that subsequent readings may be taken to determine a change in deflection. The change in deflection is then used in a formula to determine the compressive stress on wafer (40).

31 Claims, 2 Drawing Sheets

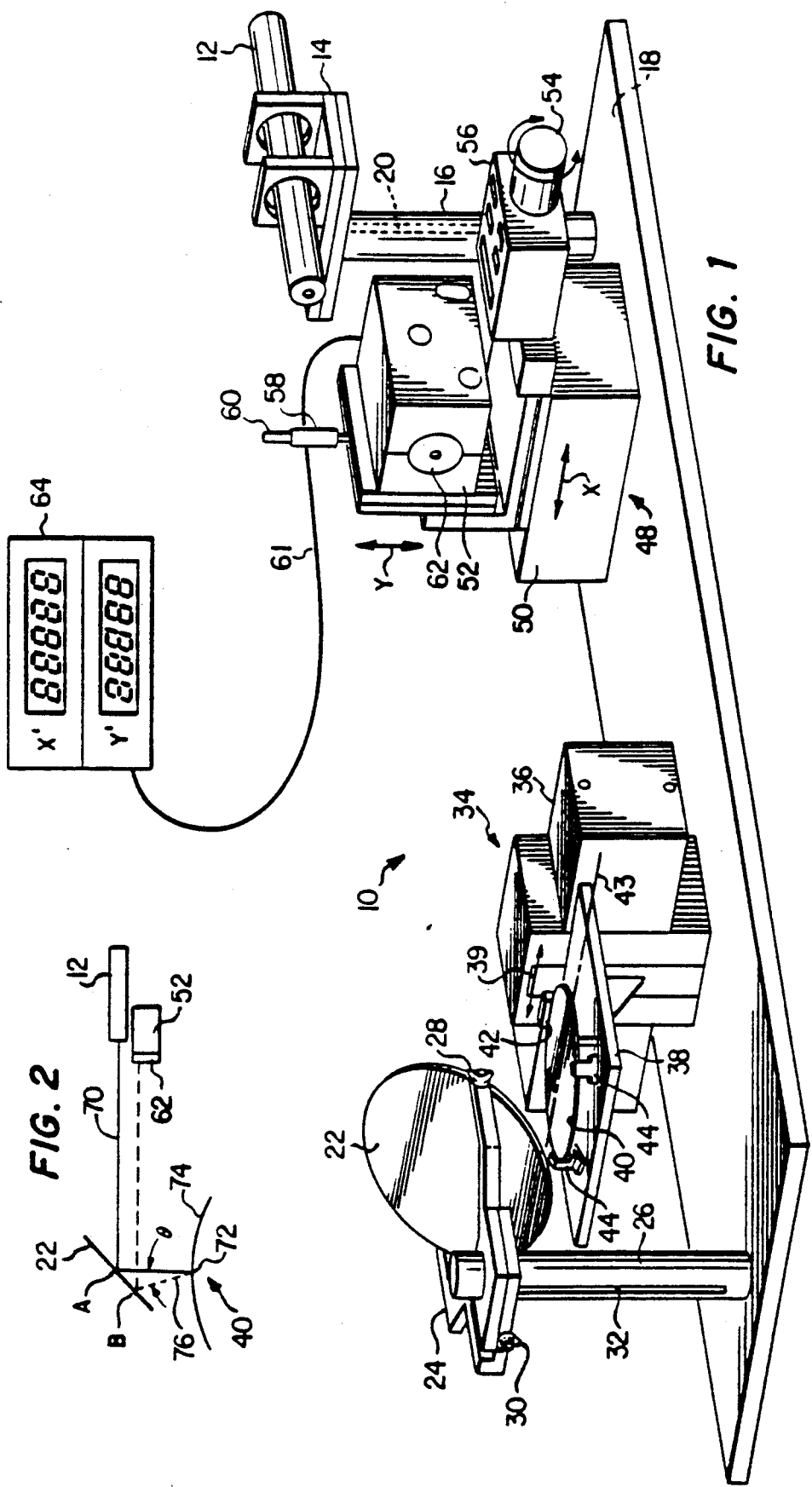

LASER STRESS MEASUREMENT APPARATUS AND METHOD

TECHNICAL FIELD OF THE INVENTION

This invention relates in general to semiconductor processing, and in particular to a method and apparatus for measuring compressive nitride stress on a semiconductor wafer.

BACKGROUND OF THE INVENTION

In semiconductor processing, a covering layer is normally applied over the surface of the semiconductor wafer as a final process step to protect circuits thereon. The protective layer typically comprises approximately 15000 Angstroms of nitride formed by chemical vapor deposition of $SiH_4$ and ammonia ($NH_3$). The wafer may then be shipped to other locations for further processing, and the nitride will provide protection against shipping damage. Additionally, the nitride will protect the circuits from dust and other contaminants during the sawing of the wafer into individual chips.

Unfortunately, nitride (frequently called compressive nitride) induces a compressive stress across the surface of the wafer which tends to cause the normally flat surface to bow. If the stress is high enough, microcracks may form in the chips which may destroy the circuits thereon. Since the microcracks are generally too small to be detected by observation, some test must be conducted to check for the possibility of damage to the wafer.

One test device commonly used is a stress gauge such as is available from Ionic Systems of San Jose, Calif. The gauge must be calibrated by using a wafer having a known stress value (such as a wafer obtained from the National Bureau of Standards) measured in $10^{-9}$ dynes/$cm^2$. The gauge uses a light source and fiber optics. The initial light beam strikes the backside of the wafer being measured and is reflected back to a fiber optic beam splitter. A fiber optics receiver sends the light to a fiber optic detector which measures the intensity of the returning light. A digital readout displays a number which represents a known wafer stress. A wafer to be tested is then placed on the gauge and a numerical readout is obtained which must be converted to a stress value by comparison to the known wafer readout.

The stress gauge is susceptible to external factors that tend to reduce the accuracy of the readout. Since the test readings are based on a supposedly known value as a standard, any error in the standard will cause error in the test values. Stress tends to diminish over time so that the known value (which is questionable in the first place) may change. Additionally, temperature and humidity affect the gauge as well as the wafer, and therefore a new base reading must be taken any time the temperature or humidity changes. Finally, the gauge requires a 24 to 48 hour warm-up to obtain the best results.

Another testing device such as the Lang X-ray Topography Camera uses X-rays to scan across a wafer to determine a radius of curvature. Prior to testing, the Lang device must be calibrated using an uncoated wafer that is assumed to be perfectly flat. To conduct a test on a coated wafer, X-rays penetrate the protective coating and are diffracted by the crystalline structure of the silicon. The diffraction of the X-rays produces deflected rays of light that may be detected and evaluated to determine the radius of curvature of the wafer. Once the radius of curvature is known, the stress on the surface may be calculated.

The Lang device is relatively expensive and requires highly skilled and trained personnel to operate, maintain and calibrate. Thus, there is a need for a relatively low cost device and method that is easy to operate and maintain and does not require the use of a supposedly standard wafer to calibrate.

SUMMARY OF THE INVENTION

The present invention disclosed herein comprises a method and apparatus for measuring compressive nitride stress on a semiconductor wafer which substantially reduces or eliminates problems associated with prior stress measuring devices. The present invention allows the accurate calculation of compressive stress across the surface of a semiconductor wafer without the necessity of a "standardized" wafer.

In accordance with one aspect of the invention, a compressive stress on a surface is calculated. A light source producing a known wavelength of light is directed toward a reflector which reflects the light onto the surface to be measured. The light is deflected at an angle from the surface back to the reflector and thence to a detector. The deflection determined by the detector is then used to calculate the compressive stress on the surface.

In another aspect of the invention, a method for determining a compressive stress on a surface is provided. A known wavelength of light is deflected from a preselected first point on a surface, and a detector receives the deflected light allowing determination of a first deflection. The known wavelength of light is again deflected from a second preselected point on the surface and received by the detector. A second deflection is determined and compared to the first deflection. A change in deflection thus determined allows calculation of the compressive nitride stress on the surface of the wafer.

It is a technical advantage of the present invention that it does not require calibration using a wafer with an allegedly known compressive stress value. It is a further technical advantage in that the apparatus is relatively inexpensive and simple to operate.

BRIEF DESCRIPTION OF THE DRAWINGS

For a more complete understanding of the present invention and for further advantages thereof, reference is now made to the following Detailed Description taken in conjunction with the accompanying Drawings, in which:

FIG. 1 is a perspective of an apparatus constructed in accordance with the present invention;

FIG. 2 is an enlarged cross-sectional view of the path of a light beam used in accordance with the preferred embodiment of the present invention.

DETAILED DESCRIPTION OF THE INVENTION

Figure 3:
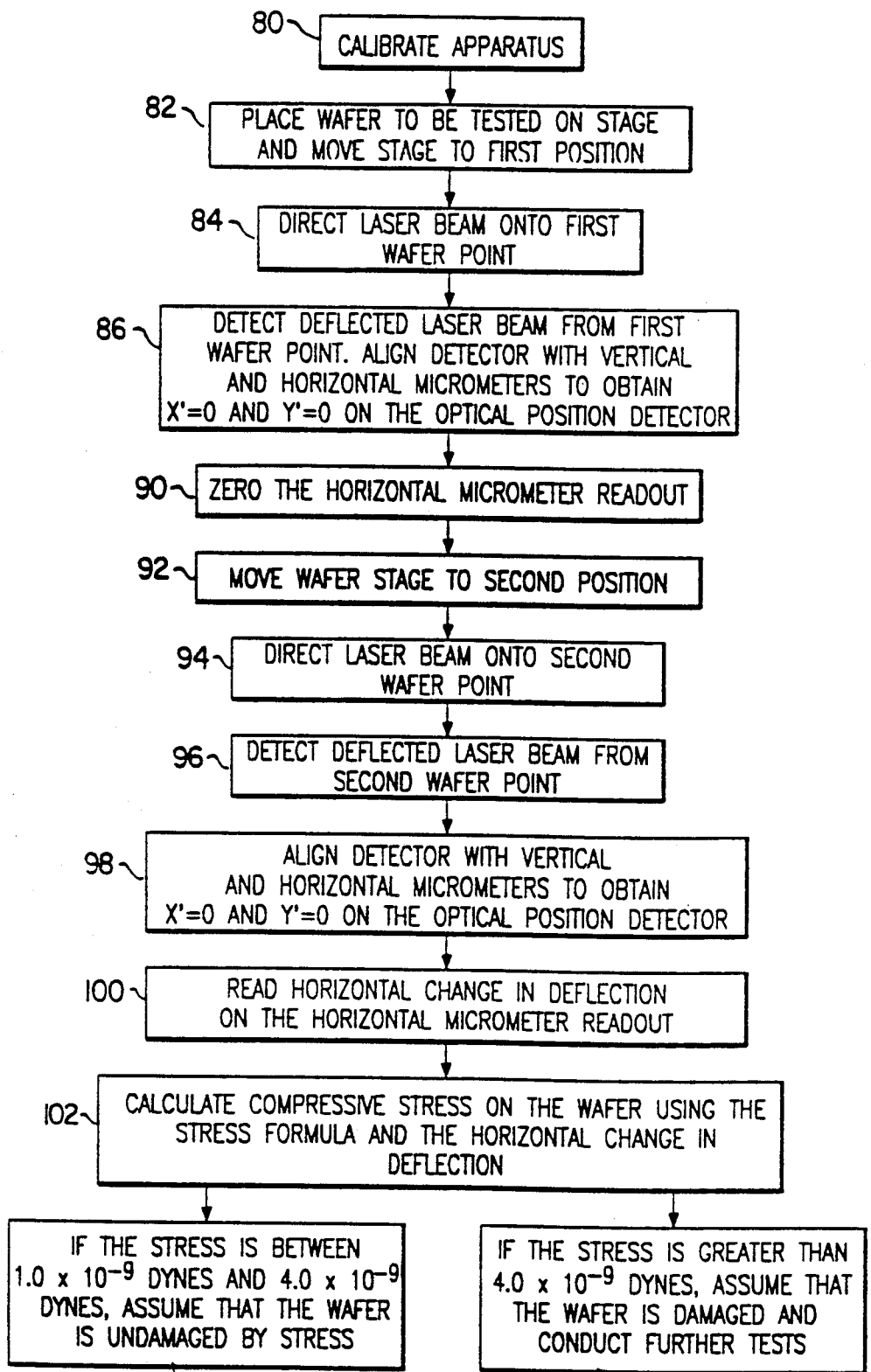
FIG. 3 is a flow chart describing the method steps of the present invention.

In FIGS. 1 and 2, like items are identified by like and corresponding numerals. Referring to FIG. 1, a laser stress measurement apparatus constructed in accordance with the present invention is generally indicated by reference numeral 10. The apparatus 10 provides data that enables the calculation of compressive stress across a semiconductor wafer caused by a protective coating of compressive nitride.

The apparatus 10 comprises a light source 12 capable of emitting a beam of light of a known wavelength. The light source 12 is preferably a low powered laser such as a 0.4 milliwatt helium-neon laser and is held by a support 14 which is in-turn carried by a rod 16. Rod 16 is securely fixed to base piece 18 by any appropriate method such as threading. A slot or groove 20 as shown by dashed lines may be formed in rod 16 to allow support 14 to be precisely adjusted for vertical position. Base piece 18 may comprise a half inch aluminum plate especially selected for having a flat surface.

Directly opposite laser 12 is a reflector 22 secured by clamp 24 and rod 26. Rod 26 is securely fixed to base piece 18 in the same manner as rod 16. Reflector 22 preferably comprises a standard flat, single reflecting mirror such as is available from Melles Griot, Inc. Reflector 22 is held in place by clamp 24 and is angularly adjustable within clamp 24 by any appropriate means such as wing nuts 28 (only one of which is shown). Clamp 24 is slidably adjustable vertically along rod 26 and may be precisely fixed in position by any appropriate method such as a wing bolt 30 and a groove 32.

Positioned proximate reflector 22 is a wafer platform assembly which is generally indicated by the reference numeral 34. Assembly 34 comprises a base 36 of suitable construction to provide accurate positioning of a wafer stage 38 which is horizontally adjustable as indicated by arrow 39. The horizontal adjustment of stage 38 is preferably provided by fixed position indicators such as stops (not shown) to allow stage 38 to be placed in a first known position (as shown in FIG. 1) and a second known position (not shown). It has been found that accurate readings are obtained by selecting the first and second positions to correspond with first and second preselected points on a wafer 40 approximately sixty millimeters apart. The preselected points should preferably be equidistant from the edges of wafer 40 and parallel to a wafer flat 42 along a common central axis 43.

Stage 38 has a plurality of wafer pedestals 44 for holding and supporting the wafer 40 to be tested. Pedestals 44 are arranged so that the flat 42 on wafer 40 may be used as a guide to properly position wafer 40. Wafer 40 is coated with a protective layer, not shown, such as compressive nitride which may cause wafer 40 to bow slightly.

Opposite assembly 34 and proximate light source 12 is a detecting assembly generally indicated by the reference numeral 48. Assembly 48 comprises a base piece 50 to support the detecting and positioning equipment thereon. Attached to base piece 50 is a detector 52 which is adjustable horizontally as indicated by arrow X and vertically as indicated by arrow Y. Detector 52 is adjusted in horizontal direction X by turning a knob 54 on a micrometer 56 and in vertical direction Y by turning a knob 58 on a micrometer 60. In the preferred embodiment, detector 52 comprises a Spot/9D Quadrant Detector which is available from United Detector Technology. Detector 52 is connected to an optical position detector 64 by an electrical cable 61. A filter 62 is provided to cover the detector 52 to allow only the known wavelength of light from light source 12 to enter detector 52.

Micrometer 56 preferably comprises a digital readout micrometer such as is available from Mitutoyo, Inc. Micrometer 56 provides a digital readout for a value corresponding to a change in direction X which will be subsequently described in greater detail.

The optical position detector 64 which may be a UDT-432 Optical Position Detector from United Detector Technology provides a digital readout X' and Y' corresponding to the direction X and the direction Y, respectively. A shelf, not shown, separate from apparatus 10 may be provided to hold position detector 64 at a convenient location for efficient operation of apparatus 10.

Prior to the conduction of tests on apparatus 10, it is necessary to ensure that all assemblies are properly aligned. Therefore, it is necessary to adjust the apparatus 10 using a flat surface mirror and a concave mirror having a known radius of curvature. The flat mirror, not shown, is placed on pedestals 44 and light source 12 is activated. Reflector 22, clamp 24 and light source 12 are adjusted with reference to each other until light from source 12 is returned directly back into source 12.

Once the assemblies are properly aligned, a simple verification test using the concave mirror is conducted. The concave mirror, not shown, having a known radius of curvature is placed on pedestals 44 and light source 12 is activated. A radius of curvature is determined by comparing a change in deflection of light from two preselected points on the concave mirror. The determined radius of curvature is then compared to the manufacturer's stated value, and if the two values are approximately the same, the apparatus 10 is considered properly aligned and calibrated for further testing. If the concave mirror meets the standards set by the National Bureau of Standards (NBS), the apparatus 10 could be calibrated to NBS standards and have NBS traceability. Thus apparatus 10 may be used to test wafers without a lengthy warm-up period and without being affected by temperature and humidity changes.

Referring to FIG. 2, an enlarged cross-section of a path of a light beam in accordance with the preferred embodiment of the present invention is illustrated. Light source 12 emits a known wavelength light beam 70 toward a first point A on reflector 22. Reflector 22 directs beam 70 onto a preselected point 72 on wafer 40 which has a bowed or arcuate shaped surface 74 resulting from the compressive stress caused by the nitride coating.

Beam 70 is deflected from preselected point 72 on arcuate surface 74 at an angle θ and is returned to a second point B on reflector 22 as indicated by dashed line 76. Beam 76 is directed from point B on reflector 22 to the light detector 52. The filter 62 allows only light of the known wavelength to pass therethrough and strike the detector 52, thus preventing any stray light from interfering with the test. The light detector 52 provides an indication of the deflection which may be used to determine the compressive stress on wafer 40 as will be subsequently described in greater detail.

Referring to FIG. 3, a flowchart of the steps to be followed in accordance with the present invention is illustrated. Block 80 shows the first step of calibrating the apparatus following the procedure previously described. In Block 82, a compressive nitride coated wafer to be tested is placed on the pedestals on the wafer stage, and the stage is moved into a first horizontal position. In Block 84, the laser is activated to direct a beam of light onto a first preselected point on the wafer. The beam of light first strikes the reflector which relays the beam onto the wafer.

The beam is deflected from the first preselected point back to the reflector and is then received by the light detector in Block 86. The vertical and horizontal micrometers are adjusted to move the light detector until the optical position detector indicates a reading of $X'=0$ and $Y'=0$. By adjusting the detector in this fashion, the deflected light strikes the exact center of the detector. In Block 90, the digital readout on the horizontal micrometer is zeroed to establish a base.

The wafer stage is then moved into a second horizontal position in Block 92. In Block 94, the laser beam is reactivated to strike a second preselected point on the wafer corresponding to the second horizontal position. The beam of light is deflected from the second preselected point on the wafer and strikes the light detector in Block 96.

In Block 98, the vertical and horizontal micrometers are readjusted to move the light detector until the optical position detector indicates a reading of $X'=0$ and $Y'=0$. Once again, these adjustments ensure that the light beam strikes the exact center of the light detector.

In Block 100, the digital readout on the horizontal micrometer is read and the value recorded. The value on the digital readout indicates a change in the deflection of light from the surface which may be used to determine the compressive stress on the wafer.

In Block 102, the compressive stress on the wafer is calculated with a formula using the value of the change in deflection found in Block 100. The stress formula used is:

$$\text{Stress} = [(E)(T^2)(D)]/[12(1-V)(L)(Z)(F)],$$

Where
$E$ = Young's Modulus (for silicon $E=1.66 \times 10^{12}$ dynes/cm$^2$)
$T$ = Thickness of the Wafer;
$D$ = change in deflection (per Block 100);
$V$ = Poisson's Ratio ($V=0.217$);
$L$ = Length of beam travel from the surface of the wafer to the reflector plus the distance from the reflector to the detector;
$Z$ = Displacement of the stage from the first position to the second position (i.e. 60 mm); and
$F$ = The thickness of the compressive nitride (or other film coating) i.e. 15,000 Angstroms.

In Blocks 104 and 106, the stress value calculated in Block 102 is evaluated. If the calculated stress value is between $1.0 \times 10^{-9}$ dynes and $4.0 \times 10^{-9}$ dynes, it is assumed that the wafer has not been damaged by compressive stress. If the stress is calculated to be greater than $4.0 \times 10^{-9}$ dynes, it is assumed that the wafer is damaged and further tests must be conducted.

Although not shown, it is to be understood that an electronic computer may be used to make the calculations in Block 102. A computer program could then control the acceptance of the change in deflection from Block 100 and automatically calculate the stress value.

Thus, a semiconductor wafer is tested for compressive stress damage using an apparatus and method that is relatively inexpensive and easy to operate and maintain. Also, there is no requirement to use a wafer having a supposedly known stress value or an assumed flat surface to calibrate the apparatus as in the prior art.

Although the present invention has been described with respect to a specific preferred embodiment thereof, various changes and modifications may be suggested to one skilled in the art, and it is intended that the present invention encompass such changes and modifications as fall within the scope of the appended claims.

What is claimed is:

1. Apparatus for determining a compressive stress on a semiconductor wafer surface, comprising:
   (a) a known wavelength light source to provide a beam of light along a path;
   (b) a light detector for receiving said light beam, said detector being separately adjustable horizontally and vertically relative to said path; and
   (c) a reflector for reflecting said beam of light directly from said light source onto the wafer surface and from the wafer surface directly to said light detector such that the compressive stress on the surface may be determined.

2. The apparatus of claim 1, further comprising means responsive to the output of said light detector for indicating the amount of compressive stress present on the wafer surface.

3. The apparatus of claim 1, wherein the light source comprises a laser.

4. The apparatus of claim 3, wherein said laser comprises a 0.4 milliwatt helium-neon laser.

5. The apparatus of claim 1, wherein said light detector comprises a quadrant detector.

6. The apparatus of claim 5, wherein said quadrant detector further includes a filter to allow only said known wavelength of light to reach said light detector.

7. The apparatus of claim 1, wherein said reflector comprises a single reflecting flat surface mirror.

8. The apparatus of claim 1, further comprising an optical position detector for indicating when said light is in an exact center of said light detector.

9. Apparatus for calculating compressive nitride stress on a semiconductor wafer surface, comprising:
   (a) a light source to emit a known wavelength of light;
   (b) a detector for receiving said light, said detector being separately adjustable horizontally and vertically;
   (c) a reflector for reflecting said light directly from said light source onto the wafer surface and from the wafer surface directly to said light detector; and
   (d) an optical position detector for indicating when said light is directly on a predetermined area of said light detector such that sequential readings may be taken to provide data for calculating the compressive nitride stress.

10. The apparatus of claim 9, further comprising means responsive to the output of said light detector for indicating the amount of compressive stress present on the wafer surface.

11. The apparatus of claim 9, wherein said light source further comprises a helium-neon laser.

12. The apparatus of claim 9, further including:
   a wafer stage for holding the wafer surface at a desired orientation to said light source; and
   a base for slidably receiving said wafer stage along a horizontal axis.

13. The apparatus of claim 12, wherein said wafer stage further comprises a plurality of pedestals for aligning and holding the wafer.

14. The apparatus of claim 9, further including:
   a micrometer for horizontally positioning said light detector; and
   a micrometer for vertically positioning said light detector.

15. The apparatus of claim 14, wherein said horizontal micrometer further includes a digital display for recording a change in horizontal positioning.

16. The apparatus of claim 9, wherein said light detector further includes a filter for allowing only said known wavelength light to pass therethrough.

17. The apparatus of claim 9, wherein said reflector comprises a single reflecting flat surface mirror.

18. The apparatus of claim 9, further comprising a means for calculating the compressive stress using the stress formula:

Stress = $[(E)(T^2)(D)]/[12(1-V)(L)(Z)(F)]$,

Where
E = Young's Modulus (for silicon E = $1.66 \times 10^{12}$ dynes/cm$^2$)
T = Thickness of the Wafer;
D = change in deflection (per Block 100);
V = Poisson's Ratio (V = 0.217);
L = Length of beam travel from the surface of the wafer to the reflector plus the distance from the reflector to the detector;
Z = Displacement of the stage from the first position to the second position (i.e. 60 mm); and
F = The thickness of the compressive nitride (or other film coating) i.e. 15,000 Angstroms.

19. Apparatus for determining the compressive stress on a semiconductor wafer surface, comprising:
(a) means for deflecting as known wavelength of light directly from a first selected point on the wafer surface;
(b) means beings separately adjustable horizontally and vertically for detecting a first deflection of said deflected light from said first selected point;
(c) means for deflecting a known wavelength of light directly from a second selected point on the wafer surface;
(d) means being separately adjustable horizontally and vertically for detecting a second deflection of said deflected light from said second selected point; and
(e) means for comparing said detection of said first deflection with said detection of said second deflection to indicate the compressive stress.

20. A method for determining the compressive stress on a semiconductor wafer surface, comprising the steps of:
(a) deflecting a known wavelength of light from a reflector directly to a first selected point on the wafer surface;
(b) detecting a first deflection of said deflected light from said first selected point;
(c) deflecting said known wavelength of light from said reflector directly to a second selected point on the surface;
(d) detecting a second deflection of said deflected light from said second selected point; and
(e) comparing said first deflection with said second deflection such that the compressive stress may be determined.

21. The method of claim 20, wherein the steps of deflecting comprise:
directing a beam of said known wavelength of light directly from a light source onto a reflector; and
reflecting said beam from said reflector directly onto said preselected point such that said beam is deflected from the surface back to said reflector.

22. The method of claim 21, wherein the steps of detecting comprise positioning a light detector to receive said beam deflected back to said reflector.

23. The method of claim 22, wherein the step of detecting further comprises moving said light detector horizontally and vertically until said beam is in an exact center of said detector.

24. The method of claim 23, wherein the step of detecting further comprises interconnecting an optical position detector to said light detector to provide a visual indication when said beam is in said exact center.

25. A method for calculating compressive nitride stress on a semiconductor wafer surface, comprising the steps of:
(a) positioning the wafer surface a known distance from a reflector;
(b) positioning a horizontally and vertically adjustable detector a known distance from said reflector;
(c) directing a beam of a known wavelength of light from a light source directly to said reflector and directly onto a first selected point on the surface, such that said light is deflected by the surface and returned directly to said reflector;
(d) detecting with said detector said deflected light returned directly to said reflector such that a first deflection is measured;
(e) directing a beam of a known wavelength of light from said light source directly to said reflector and directly onto a second selected point on the surface, such that said light is deflected by the surface and returned directly to said reflector;
(f) detecting with said detector said deflected light directly returned to said reflector such that a second deflection is measured; and
(g) comparing said first and second deflections such that the compressive nitride stress of the wafer surface may be calculated.

26. The method of claim 25, further comprising the step of aligning said light source and said reflector such that a beam of light from said light source to said reflector onto a flat surface will return directly back to said light source.

27. The method of claim 26, further comprising the step of calibrating said light source, said reflector and said detector with a concave mirror having a known radius of curvature.

28. The method of claim 25, wherein the steps of detecting further comprise aligning said detector to receive said light in an exact center of said detector.

29. The method of claim 28, wherein the steps of detecting further comprise adjusting a horizontal micrometer and a vertical micrometer to align said detector.

30. The method of claim 25, wherein the step of comparing further includes calculating the stress using a stress formula and said first and second deflections.

31. The method of claim 25, further comprising the step of calculating the compressive nitride stress using the stress formula:

Stress = $[(E)(T^2)(D)]/[12(1-V)(L)(Z)(F)]$,

Where
E = Young's Modulus (for silicon E = $1.66 \times 10^{12}$ dynes/cm$^2$)
T = Thickness of the Wafer;
D = change in deflection (per Block 100);
V = Poisson's Ratio (V = 0.217);
L = Length of beam travel from the surface of the wafer to the reflector plus the distance from the reflector to the detector;
Z = Displacement of the stage from the first position to the second position (i.e. 60 mm); and
F = The thickness of the compressive nitride (or other film coating) i.e. 15,000 Angstroms.

* * * * *